US012196999B2

(12) United States Patent
Huth et al.

(10) Patent No.: US 12,196,999 B2
(45) Date of Patent: Jan. 14, 2025

(54) ILLUMINATION UNIT HAVING A CENTRING DEVICE FOR A LIGHT GUIDE

(71) Applicant: Continental Automotive Technologies GmbH, Hannover (DE)

(72) Inventors: Tobias Huth, Langenselbold (DE); Sergej Wittmeier, Münster (DE); Jörg Thomas, Dietzenbach (DE); Felix Herchenröther, Birstein (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/023,941

(22) PCT Filed: Aug. 12, 2021

(86) PCT No.: PCT/DE2021/200107
§ 371 (c)(1),
(2) Date: Feb. 28, 2023

(87) PCT Pub. No.: WO2022/048713
PCT Pub. Date: Mar. 10, 2022

(65) Prior Publication Data
US 2024/0027676 A1   Jan. 25, 2024

(30) Foreign Application Priority Data

Sep. 1, 2020  (DE) ..................... 10 2020 211 011.5
Dec. 16, 2020  (DE) ..................... 10 2020 216 016.3

(51) Int. Cl.
*F21V 8/00*       (2006.01)
*G02F 1/1335*     (2006.01)
*G02F 1/13357*    (2006.01)

(52) U.S. Cl.
CPC ......... *G02B 6/0088* (2013.01); *G02B 6/0031* (2013.01); *G02F 1/133524* (2013.01); *G02F 1/133603* (2013.01)

(58) Field of Classification Search
CPC ..................... G02B 6/0088; G02F 1/133314
See application file for complete search history.

(56) References Cited

U.S. PATENT DOCUMENTS 8,740,446 B2 *  6/2014  Huang ............... G02F 1/133615
                                                        362/633
9,606,290 B2 *  3/2017  Chiang ................ G02B 6/0093
(Continued)

FOREIGN PATENT DOCUMENTS

CN      101539682 A      9/2009
CN      102287627 A     12/2011
(Continued)

OTHER PUBLICATIONS

Office Action dated Jun. 16, 2021 from related German patent application No. 10 2020 216 019.8.
(Continued)

*Primary Examiner* — Keith G. Delahoussaye

(57) ABSTRACT

A display with a two-dimensional display element, which is planar or curved, and an illumination unit for the display element is disclosed. The display has a light source, a light guide and a receiving housing in which the light guide is arranged. The light guide is centered in the middle in its longitudinal direction by means of a centering element in the receiving housing.

3 Claims, 12 Drawing Sheets

(56) References Cited

U.S. PATENT DOCUMENTS

| | | | |
|---|---|---|---|
| 9,817,182 B2* | 11/2017 | Choi | G02B 6/0088 |
| 10,816,717 B2* | 10/2020 | Li | G02B 6/0081 |
| 2009/0009946 A1 | 1/2009 | Oomoto et al. | |
| 2010/0002130 A1 | 1/2010 | Kamio | |
| 2010/0128465 A1* | 5/2010 | Byoun | G02B 6/0091 |
| | | | 362/97.1 |
| 2012/0002130 A1 | 1/2012 | Watanabe | |
| 2012/0120326 A1* | 5/2012 | Takata | G02B 6/0061 |
| | | | 348/790 |
| 2013/0044516 A1 | 2/2013 | Yu | |
| 2013/0083270 A1 | 4/2013 | Obata et al. | |
| 2013/0135901 A1* | 5/2013 | Ishimoto | G02F 1/133308 |
| | | | 362/617 |
| 2013/0155721 A1 | 6/2013 | Miyazaki | |
| 2013/0342783 A1 | 12/2013 | Kuo et al. | |
| 2013/0343087 A1* | 12/2013 | Huang | G02B 6/0088 |
| | | | 362/613 |
| 2014/0313773 A1 | 10/2014 | Wu et al. | |
| 2015/0338572 A1 | 11/2015 | Lee et al. | |
| 2016/0047975 A1 | 2/2016 | Kim et al. | |
| 2016/0139329 A1 | 5/2016 | Sasaki | |
| 2018/0113252 A1* | 4/2018 | Lee | G02B 6/00 |
| 2018/0210143 A1* | 7/2018 | Miyazaki | G02B 6/0091 |
| 2019/0154908 A1* | 5/2019 | Yabuuchi | G02B 6/0088 |
| 2019/0285793 A1 | 9/2019 | Jeon et al. | |
| 2021/0149106 A1 | 5/2021 | Liu et al. | |
| 2021/0271016 A1* | 9/2021 | Arihara | G02F 1/13336 |

FOREIGN PATENT DOCUMENTS

| | | |
|---|---|---|
| CN | 203082698 | 7/2013 |
| CN | 203517521 | 4/2014 |
| CN | 103851420 A | 6/2014 |
| CN | 108387967 A | 8/2018 |
| CN | 209215820 | 8/2019 |
| CN | 210982986 | 7/2020 |
| EP | 2696234 A1 | 2/2014 |
| JP | 2005077755 A | 3/2005 |
| JP | 2008078010 A | 4/2008 |
| JP | 2012015000 A | 1/2012 |
| KR | 20050015368 A | 2/2005 |
| TW | 201634987 A | 10/2016 |
| WO | 2012020592 A1 | 2/2012 |
| WO | 2013077279 A1 | 5/2013 |

OTHER PUBLICATIONS

International Search Report and Written Opinion dated Nov. 10, 2021 from related International patent application No. PCT/DE2021/200108.
Office Action dated Jun. 18, 2021 from corresponding German patent application No. 10 2020 216 016.3.
International Search Report and Written Opinion dated Nov. 9, 2021 from corresponding International patent application No. PCT/DE2021/200107.
Non-Final Office Action dated Dec. 19, 2023 from related U.S. Appl. No. 18/023,958.
Office Action dated Aug. 9, 2023 from related German patent application No. 10 2020 216 019.8.
Final Office Action dated Aug. 5, 2024 from related U.S. Appl. No. 18/023,958.
Examination Report dated Nov. 21, 2024 from corresponding European patent No. 21766119.8.

* cited by examiner

ILLUMINATION UNIT HAVING A CENTRING DEVICE FOR A LIGHT GUIDE

CROSS REFERENCE TO RELATED APPLICATIONS

This U.S. patent application claims the benefit of PCT patent application No. PCT/DE2021/200107, filed Aug. 12, 2021, which claims the benefit of German patent application No. 10 2020 211 011.5, filed Sep. 1, 2020, and German patent application No. 10 2020 216 016.3, filed Dec. 16, 2020, all of which are hereby incorporated by reference.

TECHNICAL FIELD

The present disclosure relates to an illumination unit with a centering device for a light guide, which is particularly suitable for backlighting a liquid crystal display, also known as an LCD. Such an illumination unit is often also referred to as a backlight or backlight unit.

BACKGROUND

Light guides in the backlight of LC display devices must be positioned precisely relative to the light source in the receiving housing for reasons of the optical performance. The positioning is usually carried out by applying a centering force in the longitudinal and width directions. The centering force is generally generated by the deformation of an elastic component part in the peripheral regions of the light guide.

An illumination unit is known from CN 101539682 A and TW 2016 34 987 A, in which a light guide is centered by means of support on resilient elements.

In order to accommodate the thermal expansion of the light guide and tolerances, additional space must be provided in the receiving housing. With large-format displays, there is a risk that the position and orientation of the light guide may shift relative to the light source due to insufficient compression of the centering elements at extremely low temperatures. At high temperatures, undesired deformations of the component parts may also occur due to thermal expansion. Optical influences resulting therefrom represent a significant quality risk.

It is desirable to improve the known illumination units.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A display according to the disclosure having a two-dimensional display element, which is planar or curved, and an illumination unit for the display element has a light source, a light guide, and a receiving housing, in which the light guide is arranged. In this case, the light guide is centered in the middle in its longitudinal direction by a centering element in the receiving housing. The display element has an extent that is greater, for example, by more than 50% in the longitudinal direction than in the width direction perpendicular thereto. For example, the extent in the longitudinal direction may be greater than in the width direction by more than a factor of two. The proposed centering of the light guide enables expansion compensation in the longitudinal direction with almost no change in the position of the light guide relative to the display element in the central region and only a small change in position in the outer region, viewed in the longitudinal direction. With a suitable selection of the dimensions of a cutout in the light guide into which the centering element engages, the proposed centering also makes it possible to compensate for an expansion in a direction perpendicular to the longitudinal direction.

The centering element has a hold-down device. This is, for example, a clip gripping over the surface of the light guide, a complementary bevel resting against a sloping surface of a cutout in the light guide, a projection engaging in a cutout in the light guide, or has another suitable formation. A hold-down device according to the disclosure allows the light guide to be held in the direction perpendicular to its large surface without the need for additional component parts.

The light guide is centered on the outside in its width direction by shape-changing elements in the receiving housing. An elastomer element, for example, or a spring element or a similar element that yields when force is exerted but at the same time exerts a counterforce, is provided as the change-shaping element. The separate component parts are provided for the centering function in the longitudinal and width directions, which may thus be optimized for different requirements in each case.

According to the disclosure, the centering element consists of a highly reflective material. This minimizes optical losses at interfaces between the light guide and centering unit, since such a centering element reflects light that is incident on corresponding interfaces back into the light guide.

BRIEF DESCRIPTION OF THE DRAWINGS

Further details of the disclosure may be found in the following description. In the figures.

DETAILED DESCRIPTION

Figure 1:
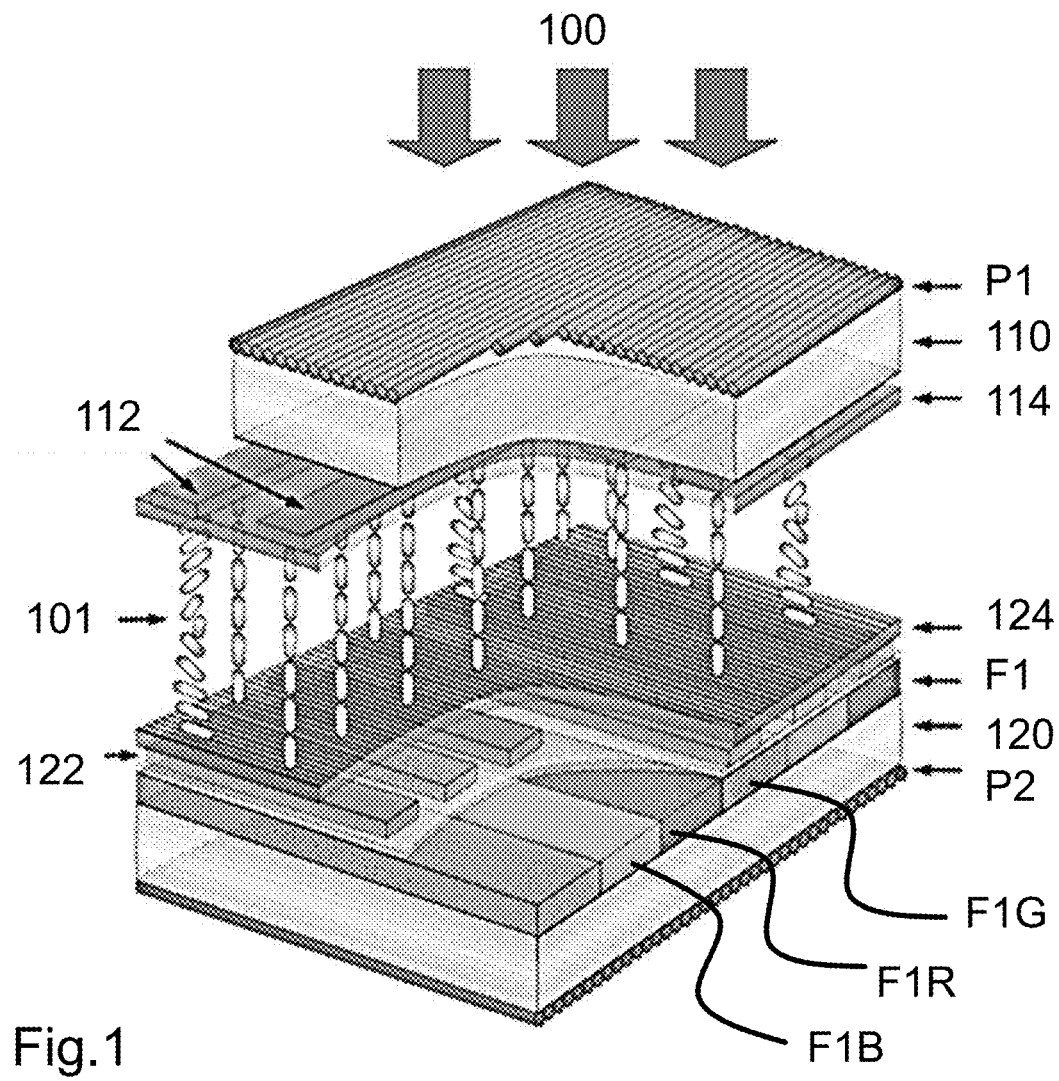
FIG. 1 shows a schematic setup of an LCD panel.

Backlight solutions for large-format curved displays in automotive applications are described.

In many fields, displays already play a decisive role in human-machine interaction. This applies for example to the automobile field, and this trend will only intensify with increasing progress in the field of "autonomous driving." LCD displays play a large part in this because they are thin, lightweight and have good optical properties. Due to their high functional reliability in difficult environmental conditions and long service life, they are the standard in the automotive sector.

Similar to consumer goods, e.g. TV sets or smartphones, there is also a trend toward ever larger display devices in the automotive sector. In most cases, these are currently still flat panel displays. However, curved displays offer vehicle designers better opportunities for integration into the vehicle interior. This technology is therefore also increasingly being implemented in current development projects. The present disclosure relates to a combination of these two development trends.

For the development of large-format displays, for example large-format flat displays or large-format curved displays, special challenges regarding the components arise. The so-called "backlight," which generates the backlighting of the device, being an integral part of every LC display, is greatly affected thereby. The backlight as a sub-assembly consists of a plurality of components that have to fulfill optical and mechanical functions in equal measure. On the mechanical side, issues such as manufacturing tolerances and thermal influences are particularly important.

The disclosure relates to a backlight with which the applicable requirements for displays in the automotive sector may be met.

As digitization progresses, the occupants may receive more and more information about the condition of a vehicle. In order for human-machine communication to remain clear, instruments whose display function is variable are required. For this reason, analog instrument clusters, for example, are increasingly being replaced by displays. For example, navigation views may be represented directly in the driver's field of view, allowing them to focus their attention on the traffic situation. In modern vehicles, combined display and control elements which not only provide information about the vehicle condition, but may also actively receive input from the occupants are also often installed.

They often have a touch function for this purpose. In order not to distract the driver's attention from what is happening on the road, modern touch displays may also be equipped with a haptic feedback function. The driver may feel a virtual button press. With increasing development in the field of autonomous driving, the demands relating to the infotainment functions also increase, since the attention of the occupants for the journey is only required to a reduced extent.

TFT-LCDs ("thin film transistor-liquid crystal displays") have a number of advantages that make them ideal for use in vehicles:
High color saturation and brightness
Good readability over a large viewing angle range
Large application range in terms of resolution, size and aspect ratio
Integrable capacitive touch technology ("in-cell touch")
Long service life
Low susceptibility to temperature
Large supplier base in terms of LCD panels Due to the points mentioned, TFT-LCDs are still the standard in the automotive sector, although OLED displays are also said to be used in future new models. However, the automotive environment places high demands on the functional reliability of the displays, with TFT-LCDs being superior to OLED displays especially in terms of service life. Curved technology, which was originally associated with displays from the consumer sector (PC monitors, TVs, etc.), is currently also finding its way into the automotive sector. The advantages of curved displays over conventional flat panel displays may also be used here.

With curved displays, the light is sent toward the viewer. After long viewing of curved displays, test subjects felt less of their visual perception, e.g. significantly less blurring, which has a positive effect on the user experience. In addition, the eyes are strained less when trying to capture all the information in the field of view.

Content may be found faster on curved display surfaces than on flat panel displays. In addition, text information may be read faster. In the vehicle, this may likewise lead to an increase in road safety, since the driver may find the information needed more quickly and focus their attention on the road again.

The use of a curved display opens up new possibilities for integrating the display into the vehicle interior. A third dimension is thus available for the design. Curved shapes are deemed to be more aesthetically pleasing. The vehicle manufacturers therefore consider primarily the design aspect. In addition to the aesthetic aspect, curved displays are easier for the driver to reach.

However, the majority of today's displays in the automotive sector are still based on flat panel technology. Curved LC display instruments currently consist mostly of a plurality of smaller displays arranged side by side behind a continuous curved cover glass. Due to the technical interdependencies, the implementation of an individual large-format curved display using TFT-LCD technology in the vehicle is a major development challenge.

The next section deals with the technical basics of TFT-LCDs. These are explained on the basis of displays.

A TFT-LCD consists of a plurality of components that are arranged in a type of sandwich structure to create the image. Two superstructures may be distinguished: The so-called bonding assembly and the backlight. The components of a display unit and the assembly processes up to the finished device will be considered in the following section.

The display panel is the imaging element of an LCD. The electro-optical properties of liquid crystals are used in the panel to generate an image from the coupled-in light. The image generated consists of individual pixels, i.e. cells that generate the image points. Each pixel in turn consists of three sub-pixels, with which the complementary colors, such as red, green and blue, are generated. The basic principle of an LCD panel is shown in FIG. 1:

FIG. 1 shows a schematic setup of an LCD panel. The coupled-in light 100 first passes through a polarizing filter P1. A polarizing filter consists, for example, of a film into which extremely fine parallel lines have been introduced. Only light having a polarization that corresponds to this preferred direction may pass through this film. Other polarization directions are blocked.

This is followed by a layer of liquid crystals 101. These are substances that have the anisotropic properties of crystals even in the liquid state. The liquid crystals 101 are located between two glass plates 110, 120 to which transparent electrodes 112, 122 are applied, which are arranged rotated by 90° with respect to one another and thus form rows and columns. Furthermore, the glasses are provided with an alignment layer 114, 124, which has microgrooves, for example, which bring about an alignment of the liquid crystal molecules in accordance with the preferred direction of the polarizing filters P1, P2. The elongated molecules of the liquid crystals 101 align themselves parallel to these grooves. Since the microgrooves of the upper and lower glass substrate 110, 120 are rotated by 90°, a helical structure is formed from the liquid crystal molecules. The polarization direction of the incident light 100 is also rotated due to the helical structure, and the light may also pass through the second polarizing filter P2. The cell appears bright. If a specific threshold voltage is applied to the liquid crystal cell, the liquid crystal molecules align themselves perpendicular to the electrodes 112, 122 and no longer influence the polarization of the incident light 100. Due to the polarization filters P1, P2 being oriented perpendicularly to one another, incident light 100 is now completely blocked by the second polarization filter P2 and the cell appears dark. A color filter F1, consisting of red color filter elements F1R, green color filter elements F1G, and blue color filter elements F1B, ensures that only a specific color component of the coupled-in white light 100 appears on the pixel.

Figure 2:
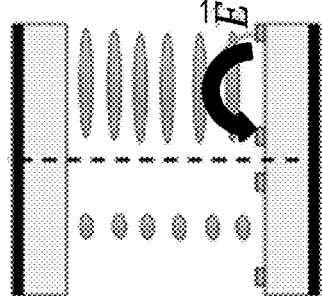
FIG. 2 shows a comparison of panel technologies.

This basic principle of changing the polarization of the coupled-in light 100 is common to all LCD displays. There are different variants for the TFT structure. The "twisted nematic" (TN) technology is no longer state of the art and is used only in the "low-cost" field. It works as described above with two opposite electrodes 112, 122 which orient the molecules perpendicularly under voltage. In addition, there is also the "multi-domain vertical alignment" (MVA) technology, in which the crystals arrange into vertically arranged planes under voltage, thus blocking incoming light. Nowadays, however, most LCDs in the automotive sector use the "in-plane switching" (IPS) technology, in which the electrodes 121, 122 are arranged on one side of the liquid crystal layer 101, here on the glass substrate 120. The liquid crystals 101 rotate here in a plane parallel to the glass 120. FIG. 2 contains an overview of the various LC technologies. The technology is specified in line Z1, and a functional diagram in line Z2. The contrast that can be achieved with the corresponding technology is specified in line Z3. Line Z4 indicates the viewing angle stability (color and contrast) with "+" as low, with "++" as medium, or with "+++" as very good. The response time in milliseconds is specified in line Z5. In the respective right-hand part of the functional diagrams of line Z2, an electric field E is applied, which is indicated by an arrow.

Figure 3:
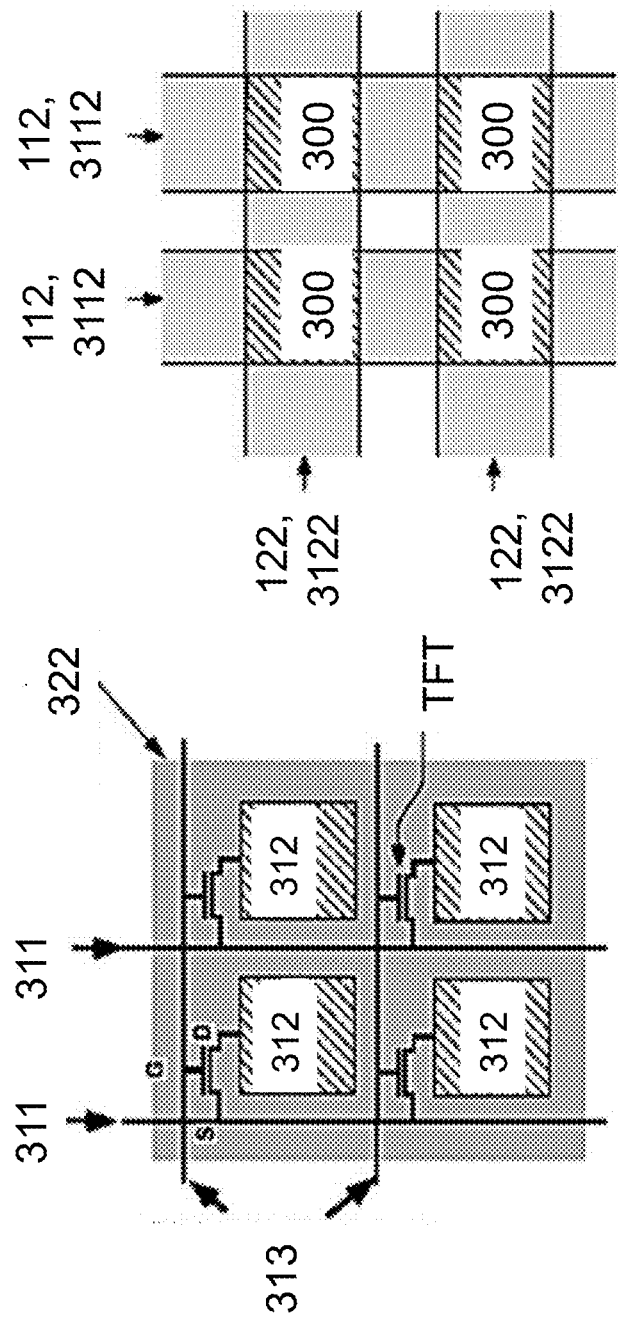
FIG. 3 shows active matrix control (left) and passive matrix control (right)

The pixels may be controlled in two different ways. FIG. 3 shows an active matrix control on the left and a passive matrix control on the right. In the case of passive matrix displays, the pixels 300 are controlled via the previously mentioned electrode strips 112, 122, which are rotated through 90° relative to one another and are shown here as column electrodes 3112 and as row electrodes 3122. A cross matrix results for the entire display, with which each cell may be controlled individually via logic circuits. The disadvantage, however, is that other cells along the column and the row are also influenced by charging effects, as a result of which grayscale levels may be represented less clearly. Therefore, active matrix displays are mostly used today. In active matrix displays, the pixels are controlled via thin film transistors TFT instead of directly via the row and column electrodes. The pixels are thus better isolated from each other and charging effects from surrounding pixels can be avoided. The pixel electrodes 312 on the one glass substrate interact with a two-dimensional electrode 322 on the other glass substrate. The thin film transistors TFT are controlled by signal electrodes 311 and control electrodes 313.

The area of the panel that has controllable pixels is referred to as the "active area" of the panel. The glass substrate of the panel protrudes a few millimeters over the active area because, for example, the driver circuits for the thin-film transistors and the connection to the display electronics are located there. The protruding region is referred to as "dead space." The display drivers on the panel itself are connected to the rest of the display electronics by a flexible printed circuit board (or FPC for short).

For use in the vehicle, the panel is connected to a cover glass, with which a touch function may also be realized. In this case, the cover glass is also referred to as a touch panel. The connection process will be explained below.

The LCD panel is connected to a cover glass in what is known as a bonding process. In order to avoid reflections of ambient light, which occur in the air gap between the cover glass and panel at the boundary layers present there, what is known as "optical bonding" takes place.

During the optical bonding, a special optical adhesive, the so-called bonding cement, is applied between the cover glass and the LC panel. The refractive index of the bonding cement is similar to the refractive index of the cover glass, so that reflection effects at the transitions are minimized. Dark regions on the panel also remain dark for the viewer and are not brightened by reflections from surrounding light sources. In this way, the desired contrast ratio is largely retained.

Figure 4:
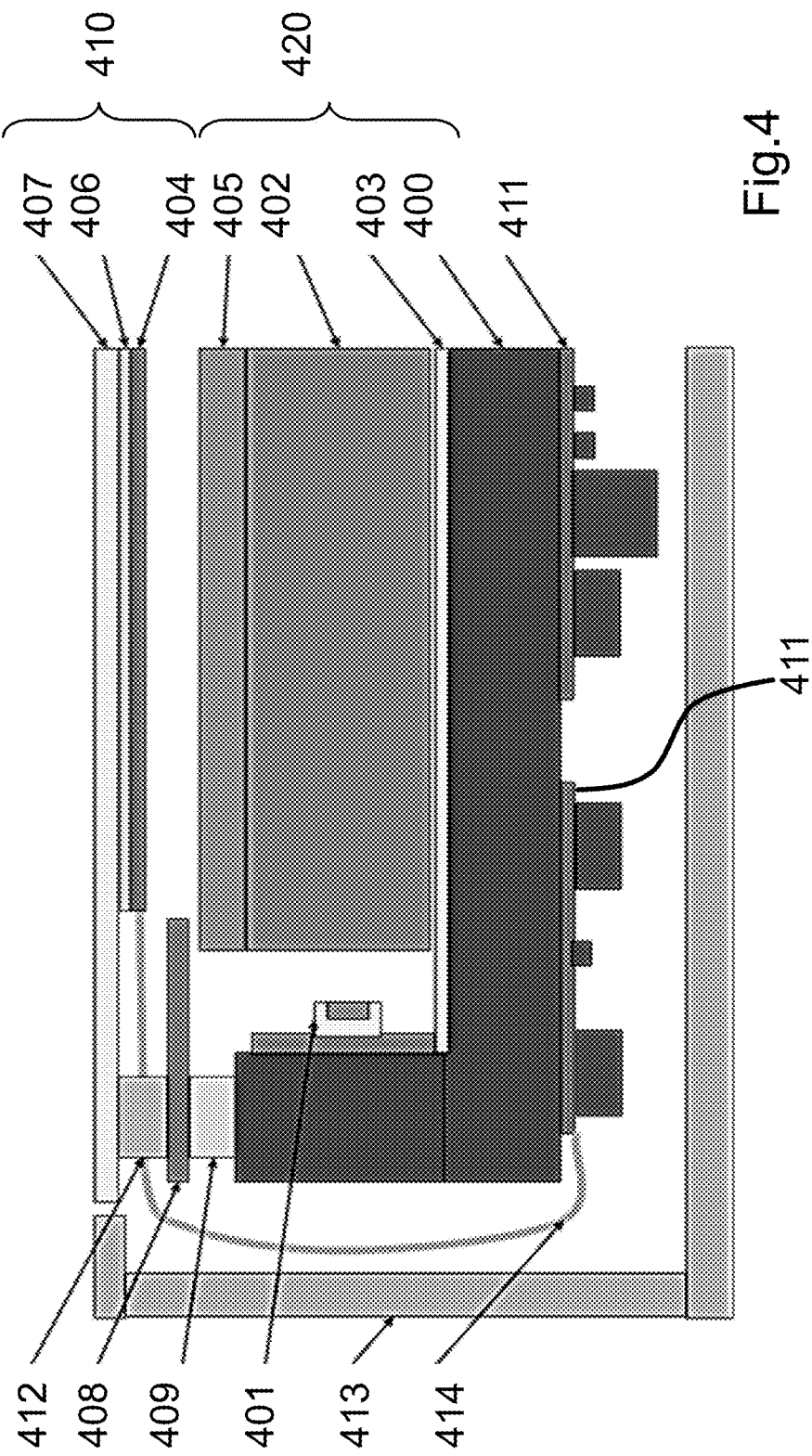
FIG. 4 shows a schematic sectional view of a display unit.

Since liquid crystals themselves do not emit any light, all LCD displays require separate backlighting. This is called "backlight". FIG. 4 shows a schematic section through a display unit. Based on this, the structure of the backlight may be explained.

The structure of the backlight of an LCD in a vehicle usually has a setup that is always similar. The light is generated by a series of light sources 401 and distributed over the surface of the display panel 404 by a light guide 402 and a reflector 403. Before the light passes through the display panel 404, the light properties are adjusted by a plurality of optical films, which are arranged one on top of the other in a film stack 405. All of these components are received in a receiving housing 400. The totality of the components 400, 401, 402, 403, 405 constitutes the backlight. Since the backlight is an integral part of every LCD, there are also a plurality of interfaces to other components, such as the bonding assembly 410 with panel 404, bonding cement 406 and cover glass 407 or the electronic circuit boards 411 (printable circuit boards or PCBs for short) for controlling the display. The essential backlight components will be presented in more detail below.

The receiving housing 400 is the central component of the backlight. It usually consists of a stable material that comprises metal and therefore has a different, usually lower, thermal expansion than plastic. It contains magnesium or aluminum, among other things, and is produced in a die-casting process for large displays, but it may also be an aluminum stamped and bent part, for example, or a metal-hybrid component part. It acts as a housing for the optical components of the backlight and as an element that provides stability. It furthermore serves as a fastening point for the electronic circuit boards 411. In some cases, the connection to the instrument panel is also realized via the receiving housing 400. In the case of free-standing displays, design covers 413 may also be attached directly to the receiving housing 400. The receiving housing 400 must therefore fulfill many different sub-functions.

The light source 401 consists of a row of LEDs which are soldered onto a circuit board which is partly flexible. If the light source 401 is oriented in the direction of the panel 404, the backlight is referred to as "direct backlight." In this case, a light guide is often not required; only a diffuser plate. In other cases, lenses are placed over the LEDs, which distribute the light homogeneously before it is scattered by the diffusion film. However, this setup leads to an increased housing depth and is not shown here. It is therefore customary in the automotive sector to arrange the light source 401 on one or more side surfaces of the receiving housing 400 and to distribute the emitted light by a light guide 402. In this case, the backlight is called "edge light."

The reflector 403 usually consists of a coated PET film, which is arranged between the light guide 402 and the receiving housing 400. The task of the reflector 403 is to "recycle" scattered light and feed it back into the optical system, for example directing it in the direction of the panel 404. This increases the optical efficiency.

The light guide 402 distributes the light of the LED strip evenly over the active area of the panel 404. It is injection molded from transparent PMMA or PC and has a special microstructuring. A prism structure (not shown here) is located on the LED side, with which the light is coupled into the light guide 402. On the reflector side, the light guide 402 likewise has microstructuring (not shown here). The latter consists of so-called "micro-lenses," which straighten the light and direct it toward the panel 404.

The film stack 405 consists of a series of optical films that affect the light properties before the light is incident on the display panel 404. After the light has passed through the light guide 402, it is first incident on a diffusion film. The latter scatters the light and homogenizes it to prevent the microstructure of the light guide 402 from being visible. This is followed by a prism film, which directs the light in the direction of the center of the display. Such a prism film is also referred to as a "brightness enhancement film" or BEF for short. As a rule, a reflective polarizing filter film ("dual brightness enhancement film" or DBEF for short) is then used, which is only transmissive to light of the polarization direction required for the panel 404. Light polarized in a different way is reflected and is again incident on the reflector 403 until the polarization direction is correct. The use of a DBEF is not absolutely necessary, but otherwise it is necessary to compensate with additional LEDs. Finally, a so-called "louver film," which blocks light from specific angles, may also be used. For example, reflections in the windshield can thus be avoided. Another name for the louver film is "advanced light control film" or ALCF. However, when using an ALCF, further light sources must likewise be provided due to a 25 percent loss of luminance.

The retainer 408 serves to prevent the films of the film stack 405 and the light guide 402 from falling out. The retainer is often a stamped sheet metal part, which is usually connected to the receiving housing 400 via a double-sided adhesive tape 409. The retainer 408 may also be a stamped or injection-molded plastics part, for example. On the panel side, the cover glass 407 with the bonded panel 404 is attached to the retainer 408 with the aid of an adhesive, for example a liquid adhesive 412. With this setup and the use of these flexible materials, flatness tolerances of the cover glass 407 and backlight can be compensated. This prevents stresses from being caused in the display panel 404, which lead to image inhomogeneities.

In the case of displays from the consumer goods sector (smartphones, tablets, etc.), there is a trend towards making the optically inactive peripheral region increasingly narrow. In some cases, the displays are intended to even appear completely borderless to the user. This trend is also being carried over to the automotive sector. It is referred to as a "narrow border" design and creates additional development requirements. The installation space for centering elements and fixations for light guides 402 and optical films in the receiving housing 400 is increasingly being reduced. In new projects, there is often less than 10 mm of space available from the periphery of the actively displaying region to the outer edge of the display unit.

First, the components of the backlight are mounted. The backlight assembly 420 and the previously manufactured bonding assembly 410 are then connected to form what is known as the display closing assembly. This is usually done with a liquid adhesive 412 that is applied to the retainer 408 before the bonding assembly 410 is put in place. Up to this point, particular care must be taken to ensure that no dirt particles are trapped in the device, as these can lead to optical defects. Humidity and ambient temperature must also be taken into account. For this reason, these process steps are taken under clean room conditions.

During the subsequent final assembly, the PCBs 411 are attached to the receiving housing 400 and further cover elements, for example the design cover 413, or components for connection to the instrument panel in the vehicle are attached. One of these components is, for example, a flexible printed conductor track 414 that leads to the display panel 404. The display unit is thus ready for delivery.

One task is to develop a backlight concept based on previous flat panel technology, which may be used in large curved display units, also known as curved displays, of different dimensions.

The centering of the light guide 402 in the receiving housing 400 requires increased care. The receiving housing 400 quasi establishes a tolerance-prone mechanical connection between the LED strip and the light guide 402. In the case of particularly large light guides 402, a large thermal expansion occurs. Sufficient space must be provided around the light guide 402 to accommodate the expansion.

At a maximum operating temperature of 85° C., in one exemplary embodiment, with a length of approximately 740 mm in the longitudinal direction, thermal expansion of around 3 mm takes place, i.e. a change in length, and with a width of approximately 140 mm for the thermal expansion in width, the value is approximately 0.5 mm.

Since the temperature application range is to be from −40° C. to 85° C., there is a contraction of the same amount at the cryogenic temperature. Despite this large thermal expansion and the vibrations that occur during operation, the precise positioning of the light guide 402 must be ensured.

The interface between the reflector 403 and the light guide 402 is also critical. The background is that the use of a reflector 403 made of film material may be used only to a limited extent on curved displays. Simply folding the film up to cover the side surfaces of the light guide 402 would result in compression at the curved upper side and thus in the film arching. In addition, there would be a risk at the side surfaces that the film might lie flat again when installed. Due to the aforementioned thermal expansion of the light guide 402, a large amount of space must be provided laterally in the receiving housing 400. A folded-up reflector film is "free" in this region, so that the fold may deviate from a 90° angle. In this case, the reflectivity and thus the optical performance of the device would be reduced.

Another crucial interface is between the light guide 402 and the optical films 405 and between the optical films 405 and the retainer 408. This involves holding down the light guide 402 and the optical films 405. A detachment of the films 405 from the light guide 402 may lead to optical defects and undesirable rattling noises. However, the hold-down must also be designed in such a way that thermal expansion does not cause any arching, which in turn would cause optical disturbances. In the case of large planar or curved light guides 402, there is also the possibility that the light guide 402 may exert forces on the retainer 408 due to manufacturing tolerances and distortion in the direction of curvature. These forces must be absorbed and must not lead to a positional deviation between the light guide 402 and the LED strip in the peripheral regions. Aspects of the disclosure are based on the optimization of said interfaces.

Figure 5:
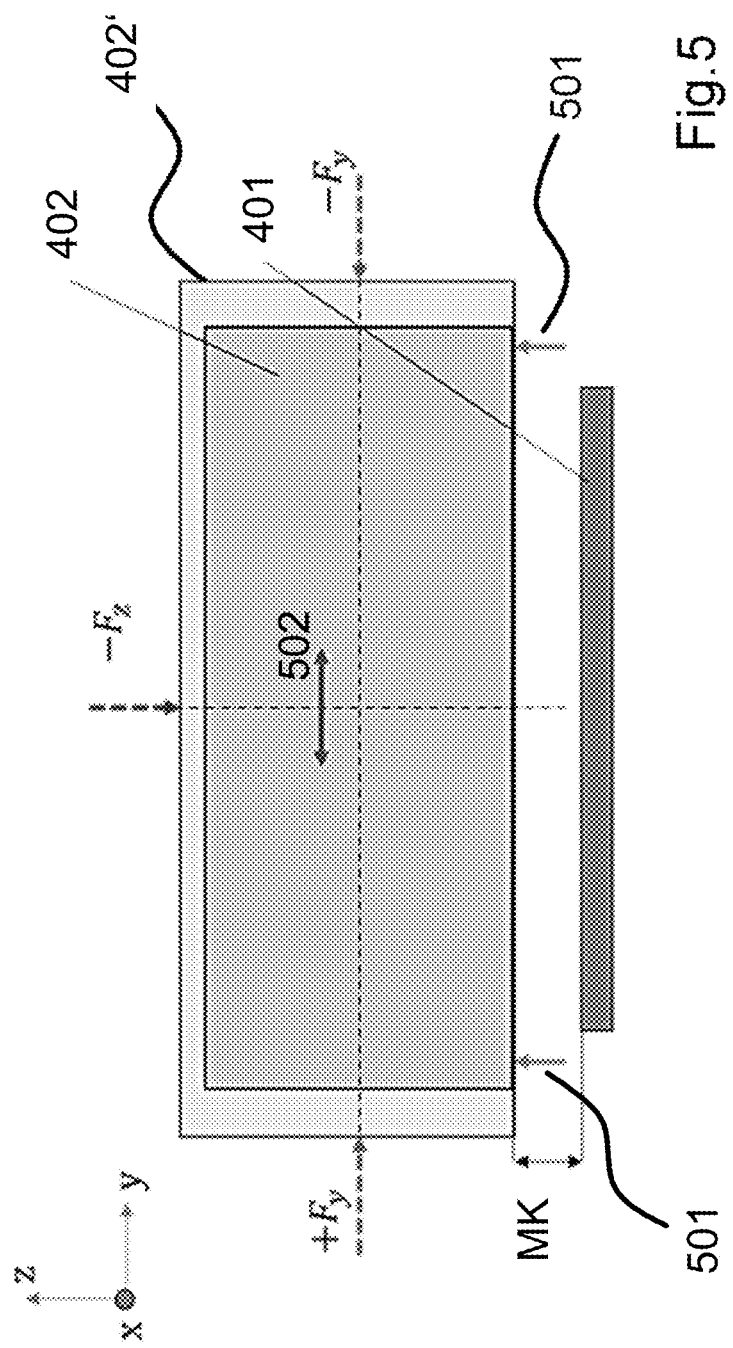
FIG. 5 shows a basic principle for centering the light guide in the receiving housing.

FIG. 5 illustrates the underlying principle of action for centering the light guide 402 in the receiving housing 400. It shows the light guide 402 in normal expansion and the light guide 402' with thermal expansion. Centering Forces $F_Y$, $F_Z$ are indicated by dashed arrows, a fixed stop is indicated by the arrow 501. A double-headed arrow 502 indicates the fixation of the z main axis of the light guide 402 in the receiving housing 400. In this embodiment variant, the light source 401 is arranged at the longer one of the two narrow sides of the light guide 402.

The critical dimension MK in the z-direction between the light source 401 and the light guide 402, 402' should be maintained as precisely as possible under all operating conditions. To ensure this, a fixed stop 501 is provided on the underside of the light guide 402, 402'. The light guide 402, 402' is pushed by a force $F_Z$ permanently against this stop 501 in the negative z-direction. In order to enable thermal expansion in the z-direction, the point of attack of the force may be shifted in the z-direction. A thermal expansion even greater than in the z-direction likewise takes place in the y-direction. In order to still align the light guide 402, 402' centrally above the light source 401, it may be fixed in its main axis. An expansion may take place unhindered at the sides. In addition, a symmetrical centering force $F_Y$ may be applied on the left and right side surfaces in each case. In this case, the point of attack of the force is designed to be shiftable in the y-direction. In any case, the centering forces $F_Y$, $F_Z$ exceed the external forces during operation in order to prevent rattling noises or the light guide 402, 402' from slipping.

Figure 6:
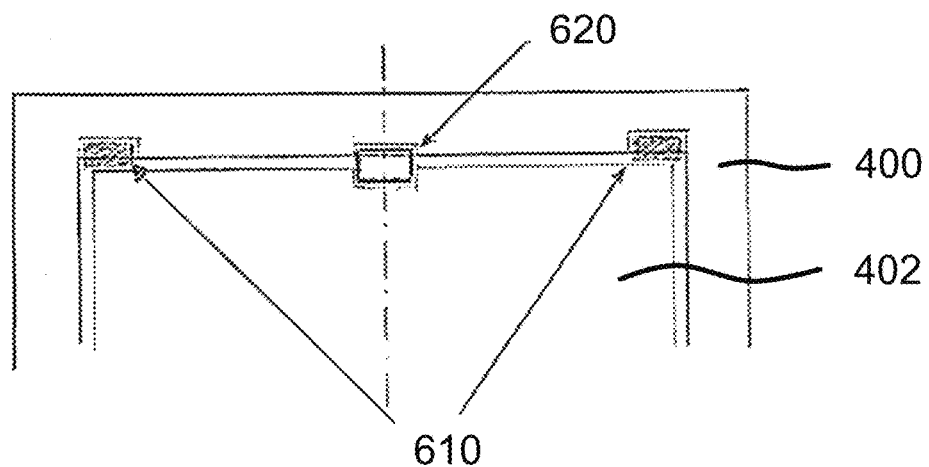
FIG. 6 shows centering of the light guide in the receiving housing.

FIG. 6 shows an embodiment for centering. The centering force $F_Z$ is applied in the z-direction by rubber elements 610 as shape-changing elements 61. The centering in the y-direction is taken on by a plastics element 620 as the centering element, which is installed and staked in the middle on the upper side of the light guide 402. The plastics element 620 may also be attached in another way. At this point there is also the possibility of implementing a hold-down function for the light guide 402. The light source 410 is located at the bottom in the depiction, outside of the region shown. The light guide 402 is arranged in the receiving housing 400.

Figure 7:
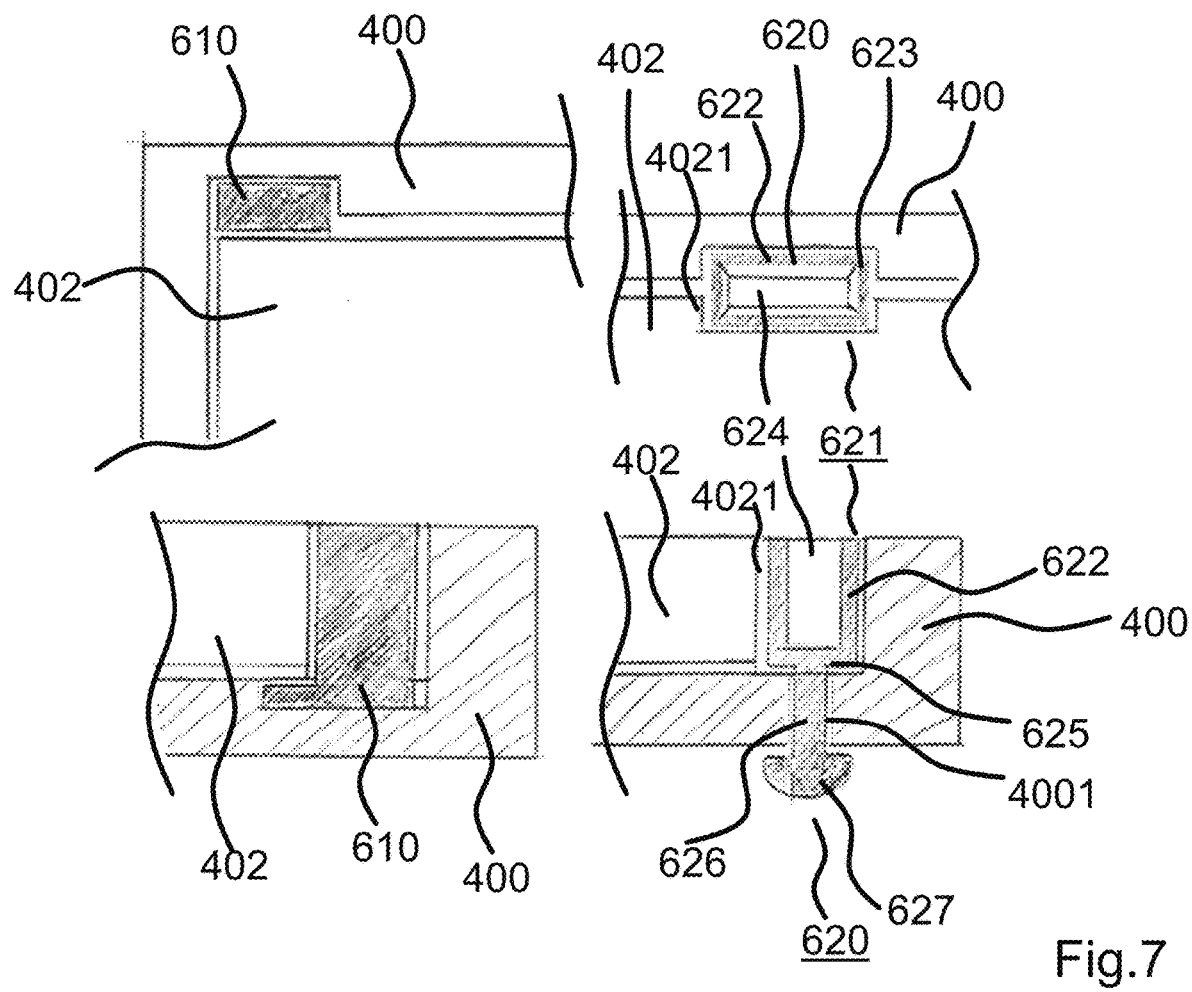
FIG. 7 shows detailed views of FIG. 6.

FIG. 7 shows detailed views of the variant shown in FIG. 6. Top left is a top view of the rubber element 610, as an example of a shape-changing element 61. Below that is a sectional view in a plane parallel to the dashed line shown in FIG. 6, which runs through the rubber element 610. It may be seen that the rubber element 610 is compressed by the light guide 402 in the region in which it is in contact with the latter. The force exerted by the rubber element 610 on the light guide 402 serves to center the latter in the z-direction. The top right shows a top view of the centering element 62 designed as a plastics element 620. Below that is a sectional view in a plane corresponding to the dashed line in FIG. 6. The centering in the y-direction takes place via the centrally attached plastics element 620, which is arranged in a cutout 4021 in the light guide 402, which is thus fixed in the y-direction. This may be seen at the top right. The hold-down function cannot be seen in this sectional view.

The plastics element 620 has a hollow box 621 which is open in a first direction and whose walls 622, 6232 and base 625 enclose a cavity 624 which is open on one side. A bar 626, which is arranged in a cutout 4001 in the receiving housing 400 and is staked therewith, adjoins the base 625 in the direction opposite the first direction. The bar 626 may also be riveted, screwed or be otherwise attached. A staking head 627 which overhangs the cutout 4001 may be seen. The bar 626 may be configured as a round post or as a wall with an elongated cross-section corresponding to any other suitable shape.

Figure 16:
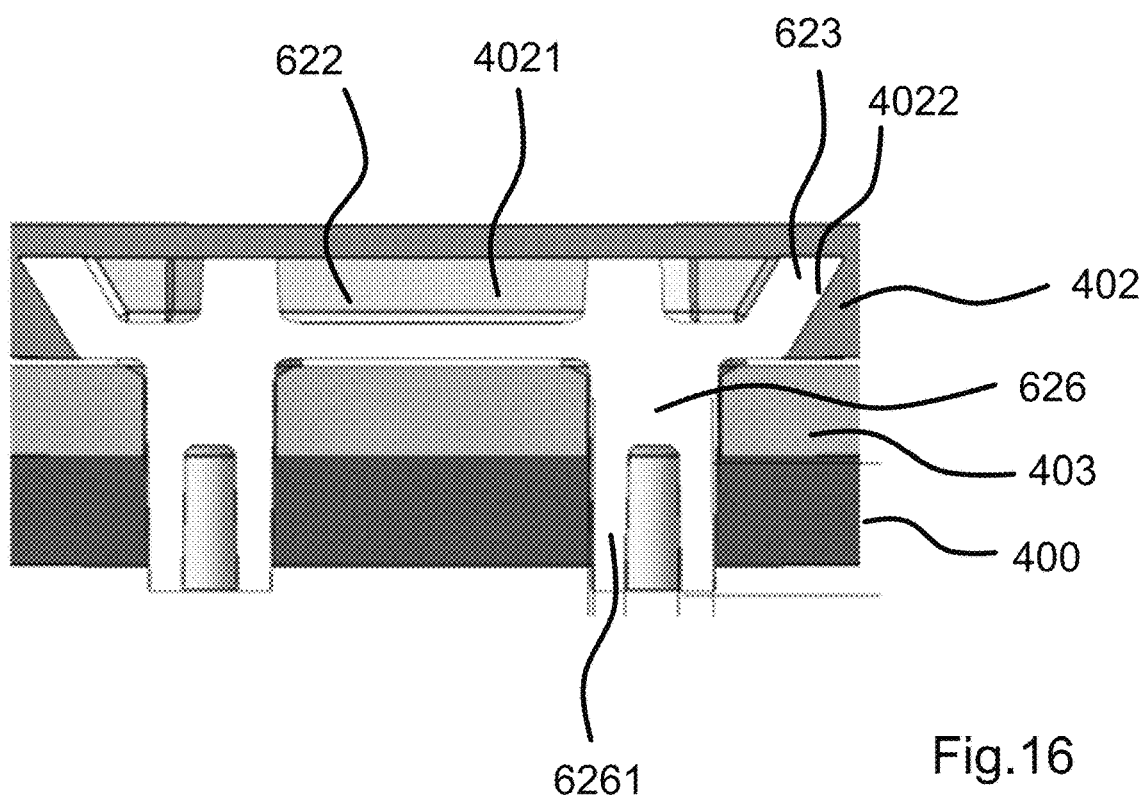
FIG. 16 shows a detailed view of FIG. 7.

FIG. 16 shows a further detailed view of FIG. 6. The plastics element 620 is shown here in a sectional view rotated by 90° with respect to FIG. 7. The light guide 402, which has a cutout 4021 with a sloping undercut 4022, may be seen in the upper region. A correspondingly sloping side wall 623 of the plastics element 620 bears against the slope of the undercut 4022. This provides the hold-down effect by the plastics member 620 on the light guide 402, which plastics member is staked, riveted, screwed or otherwise secured to the receiving housing 400 at its two downwardly projecting legs 6261.

This includes the decoupling of the functions, which enables a simplified component part structure. Furthermore, expansion compensation is made possible by the central centering. This also enables film centering and hold-down. The opening in the receiving housing 400 required for the attachment of the plastics element 620 is closed directly during manufacture by the staking. Other suitable types of attachment may also be used.

Figure 8:
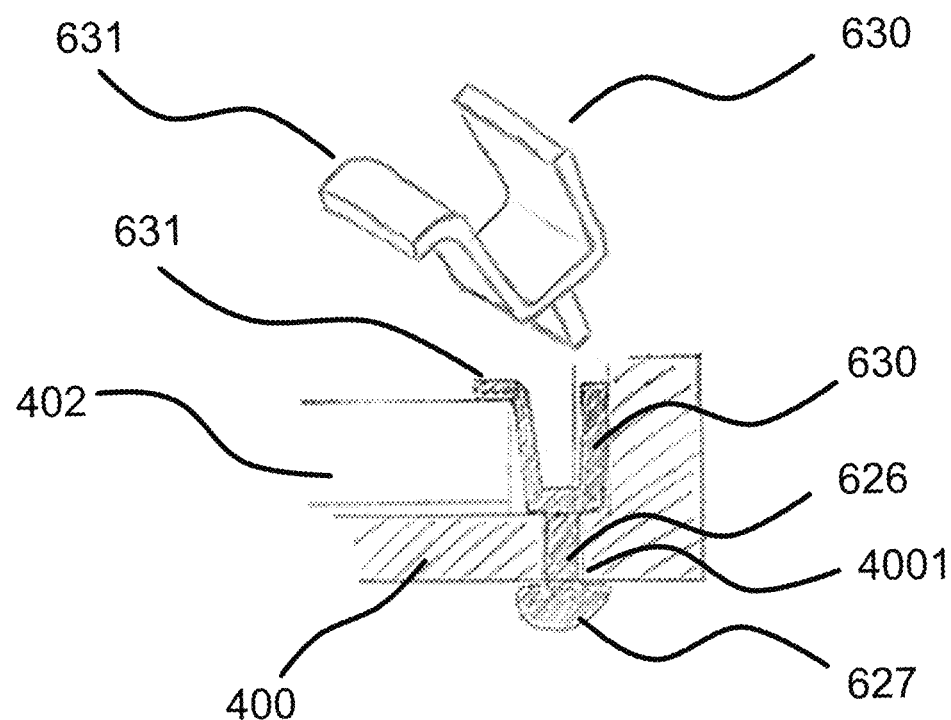
FIGS. 8-12 show alternative embodiments for centering the light guide in the receptacle housing.

FIGS. 8-12 show alternative embodiments for centering the light guide 402 in the receiving housing 400. FIG. 8 shows centering via a plastics clip 630, which is connected to the receiving housing 400, for example by staking, riveting or screwing. The plastics clip 630 protrudes in an end region 631 over the light guide 402 and exerts a hold-down force on it. According to one variant, a plurality of such plastics clips 630 are arranged in a distributed manner. The centering function takes place, for example, as previously indicated. Owing to the centering, expansion compensation is also possible here. Centering and hold-down is also made possible here. Likewise, the required opening 4001 in the receiving housing 400 is closed directly during production.

Figure 9:
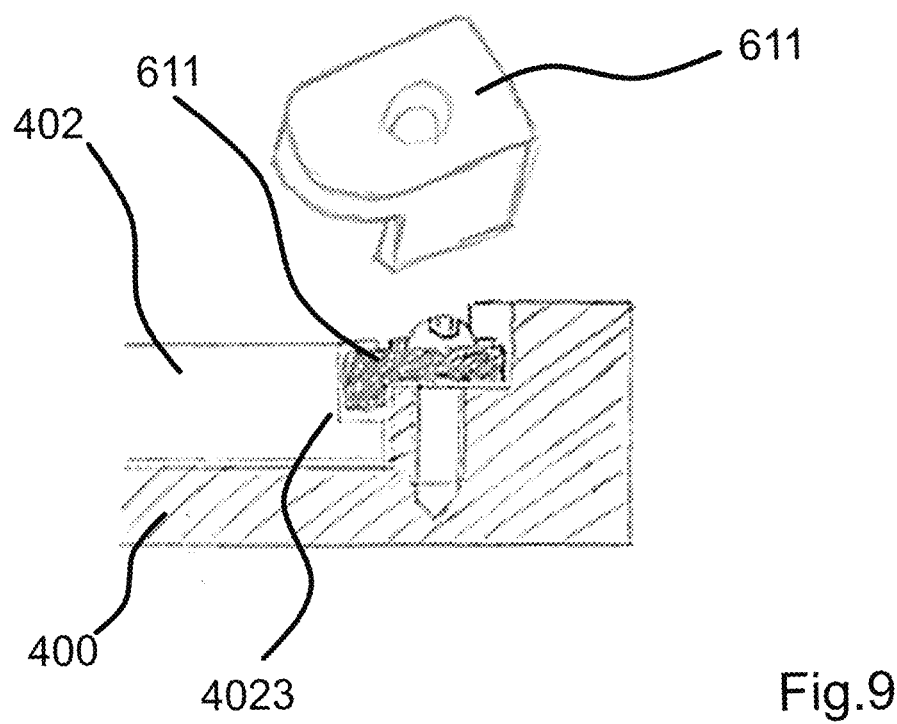

FIG. 9 likewise shows centering in the middle. In this embodiment, round rubber buffers 611 are used, which are screwed and crimped to the receiving housing 400. Here, too, a plurality of rubber buffers 611 may be provided, which apply the necessary centering force. Owing to the centering, expansion compensation is also possible here. The light guide 402 may also be held down here by way of protruding into a partial cutout 4023 in the light guide 402.

Figure 10:
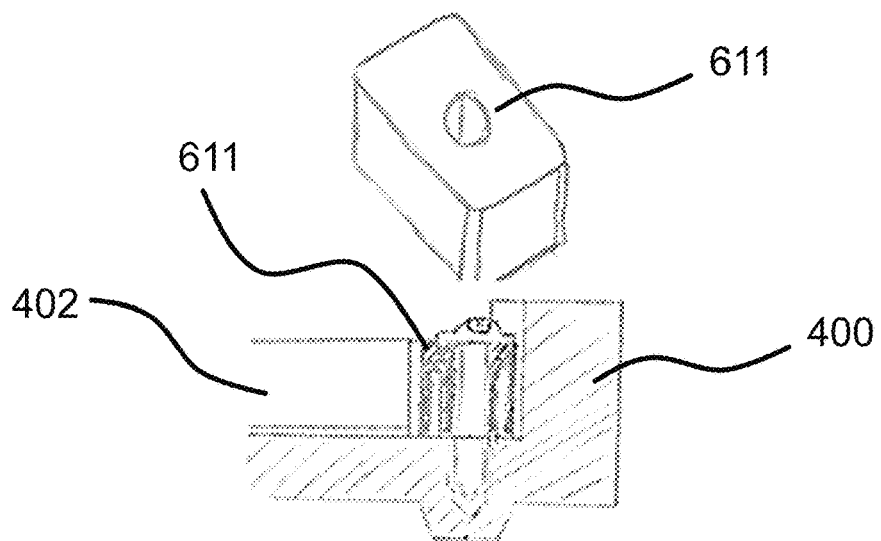

FIG. 10 likewise shows centering in the middle. Rubber buffers 611 are also provided here. In contrast to the previous variant, they are only laterally in contact with the light guide 402 and do not exert any hold-down force on it. This allows them to be designable to also center the films. Owing to the centering, expansion compensation is also possible here.

Figure 11:
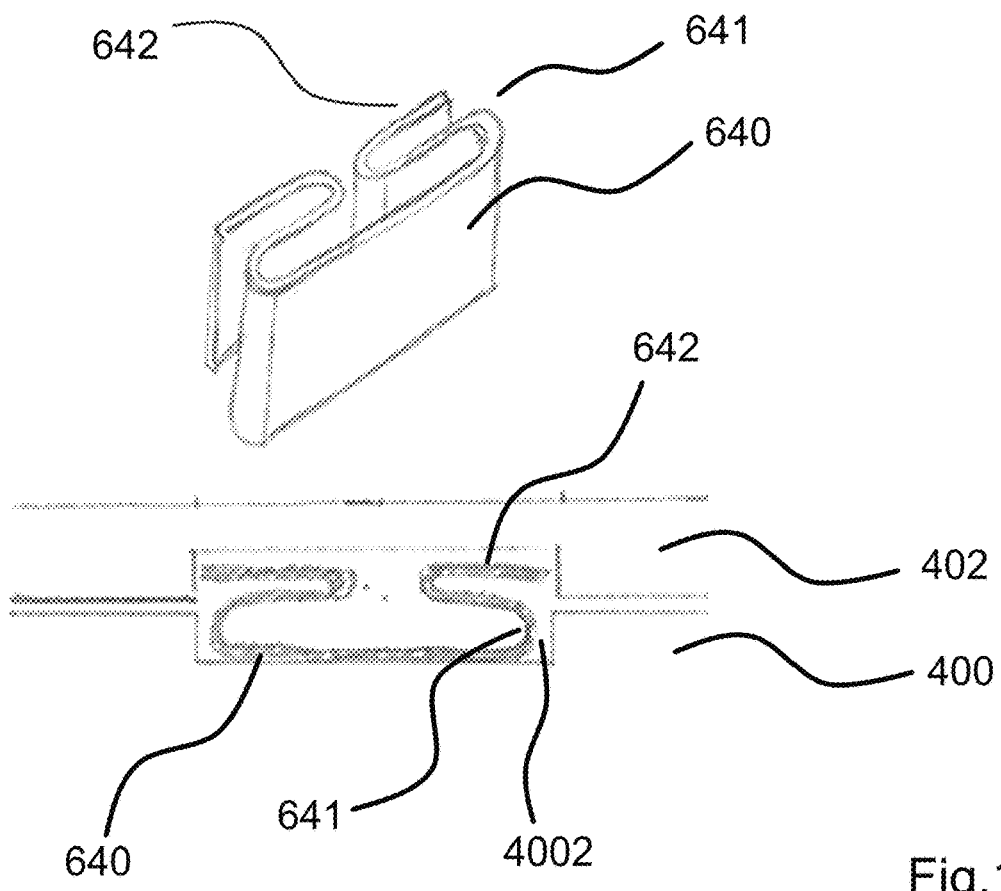

FIG. 11 shows a further embodiment of centering in the middle. A metal spring 640 is provided here, which in the embodiment shown rests with a base part 641 in a cutout 4002 in the receiving housing 400, and with resilient end parts 642 in a cutout in the light guide 4025. Here, too, an embodiment makes provision for a plurality of springs 640 to be provided in order to apply the required centering force. Owing to the centering, expansion compensation is also possible here. Furthermore, the design as a metal spring 640 enables potentially high centering forces using a single metal spring 640 or alternatively using a few metal springs 640.

Figure 12:
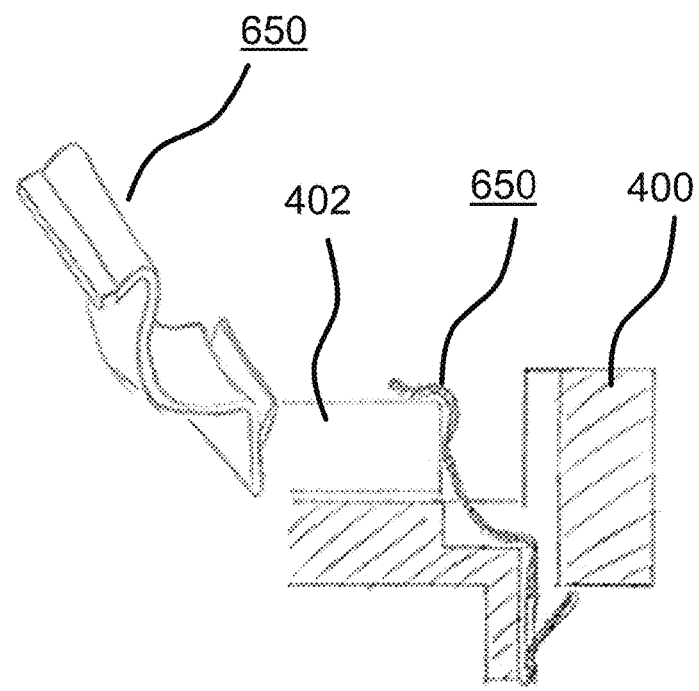

FIG. 12 shows a further embodiment of centering in the middle. Here, the centering in the middle is achieved via metal clips 650, which snap into place in the receiving housing 400. According to an embodiment, a plurality of metal clips 650 are also provided here, which together apply the necessary centering force. Owing to the centering in the middle, expansion compensation is also possible here. Furthermore, a suitable design of the shape of the metal clips 650 makes it possible both to center the film and to hold down the light guide 402, or to realize only one of these two additional functions. A plurality of functions are thus realized in one component, which reduces the number of component parts.

Figure 13:
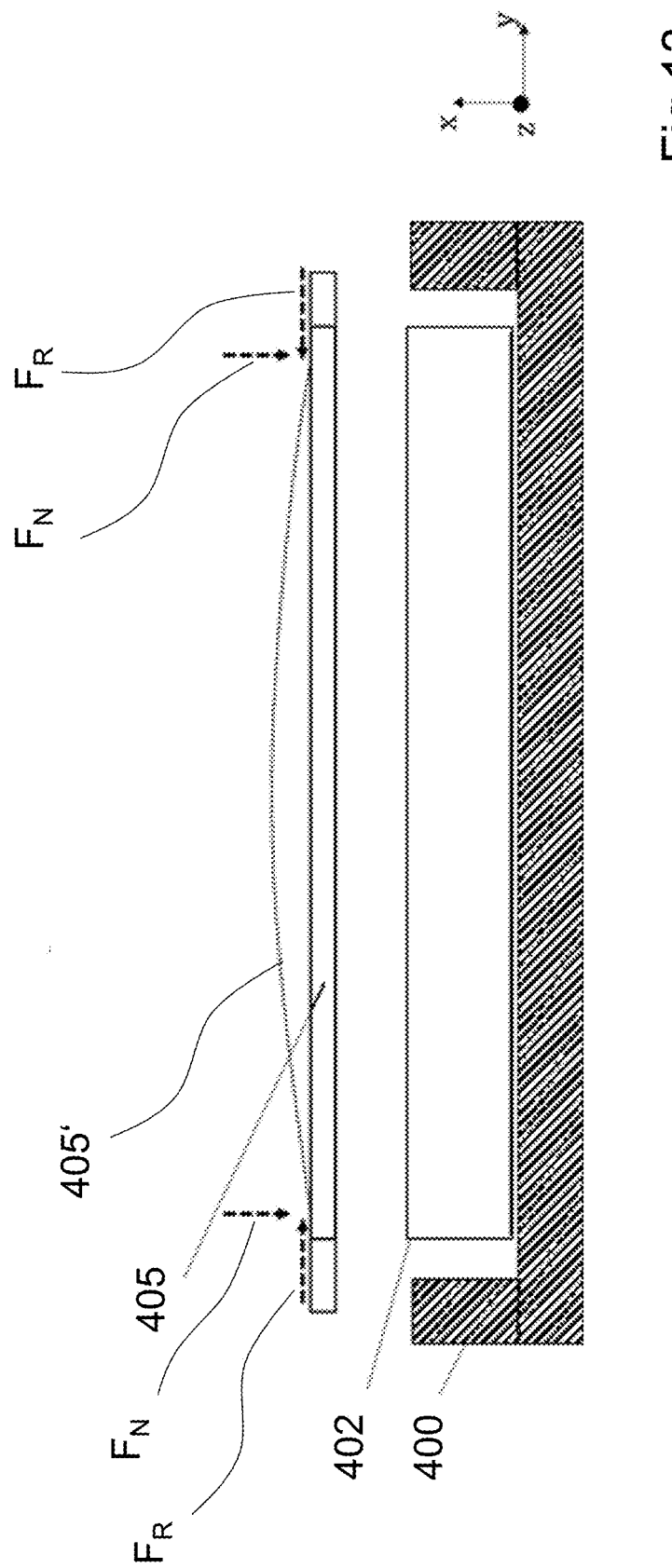
FIG. 13 shows a basic principle for fixing optical films and light guides.

FIG. 13 shows in simplified form the principle of action for holding down the optical films in the film stack 405 and the light guide 402. It shows the light guide 402 in the receiving housing 400. The film stack 405 is also shown separately for the sake of clarity, that is to say at a distance from the light guide 402. A deformation due to thermal expansion or due to arching is indicated in the indicated arched film stack 405'. The directions of a hold-down force FN and a friction force FR are shown by dashed arrows.

In order to avoid optical disturbances caused by detachment of the films in the film stack 405, the films must be held down on the light guide 402. In principle, the hold-down may take place via a material connection between the films and the light guide 402 or the receiving housing 400. In addition, the hold-down function may be taken on by an additional component part, which exerts a permanent hold-down force. This hold-down force ought to be sufficient to prevent the components from rattling. In addition, thermal expansion of the films should be ensured at the same time in order to prevent the films from arching, as shown in the arched film stack 405'.

In the case of planar, but in particular curved display applications, it should also be noted that the light guide 402 may have a distortion in the x-direction with regard to the radius of curvature. Due to the faster cooling of the melt in the corner regions, the solidified regions may no longer relieve the stresses through flow and become deformed. The amount of distortion depends on a large number of parameters during the injection molding process of the light guide 402. Consequently, depending on the magnitude of the distortion, the light guide 402 may exert a force on the holding down element that must be absorbed.

Figure 14:
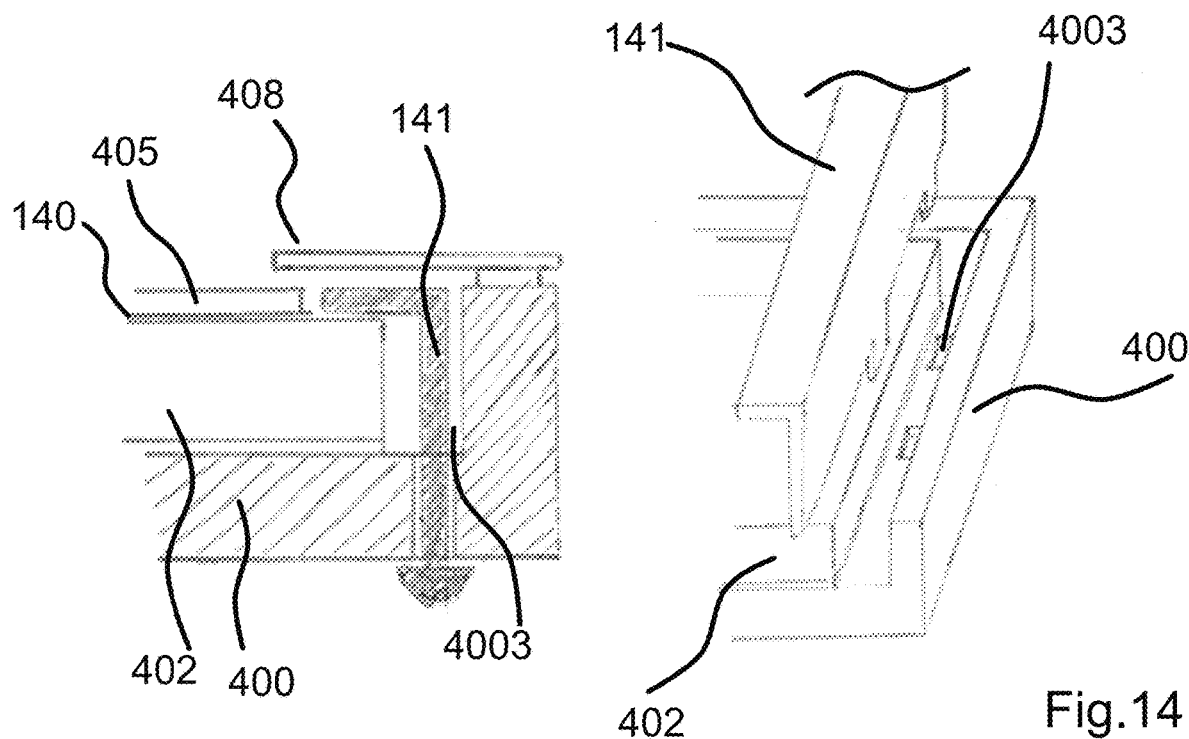
FIGS. 14 and 15 show embodiments for fixing optical films and light guides.

FIG. 14 shows an embodiment for fixing optical films in the film stack 405 and light guide 402. The films are held down here by adhesive bonding 140 to the light guide 402. The light guide 402 is held down by fixing elements 141 arranged on the left and right. These are preferably staked in the receiving housing 400. There is no stress on the retainer 408 if the optical guide is distorted. A precise positioning of the light guide 402 in the peripheral region is made possible. A retainer 408 is only required at the top and bottom. Openings 4003 in the receiving housing 400 are closed directly during the staking.

Figure 15:
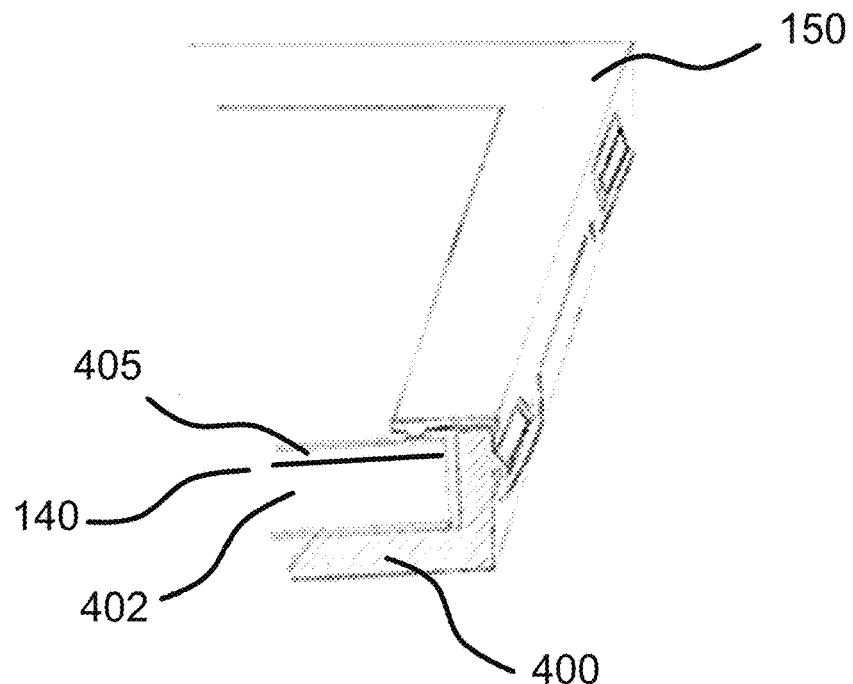

FIG. 15 shows a further embodiment for fixing optical films in the film stack 405 and light guide 402. The films are held down here by adhesive bonding 140 to the light guide 402. The light guide 402 is held down by clamping using an element 150 provided for centering. With this embodiment, there is no need to attach a retainer, which is usually done by adhesive bonding, for example. A flat design is enabled.

In an embodiment is one involving the splitting of the centering function in the y- and z-directions over a plurality of components 610, 620, described with reference to FIG. 6. The application of the centering force in the z-direction via elastomer elements means that a high level of functional reliability may be expected. In the y-direction, this variant offers the advantage that the thermal expansion does not have to be absorbed by an externally located centering element. The light guide 402 may expand unhindered in the y-direction owing to the centrally arranged centering element.

Another embodiment is that described for FIG. 12, in which a plurality of clipped metal clips 650 apply the centering force.

Fixation of optical films and light guides: The embodiment described for FIG. 14 is for holding down the films and the light guide 402. In the process, the light guide 402 is pressed against the receiving housing 400 at the sides by staked additional elements 141. This is advantageous since distortion is to be expected when the light guide 402 is injection molded. The curvature of the light guide 402 may be adapted to the curvature of the receiving housing 400 by the additional hold-down devices. The curvature of the light guide 402 may then be designed in such a way that, despite any possible distortion, the light guide always has a smaller radius of curvature than the receiving housing 400. The additional staked component parts allow the light guide 402 to be positioned at the outer edges with greater accuracy in relation to the LEDs. In this variant, the optical films are adhesively bonded onto the light guide 402. In this way, the films can be fixed with high positional accuracy, while sufficient installation space may be provided all around to accommodate their thermal expansion.

For centering the light guide 402 in the mounting housing 400: Centering in the z-direction via elastomer elements 61, 610, 611 arranged on the outside and in the y-direction via a centrally arranged and staked plastics element 620 with hold-down function.

For fixing optical films and light guides 402: Holding down the films by adhesive bonding 140 on the light guide 402 and holding down the light guide 402 by staked fixing elements 141 in the peripheral regions.

Figure 17:
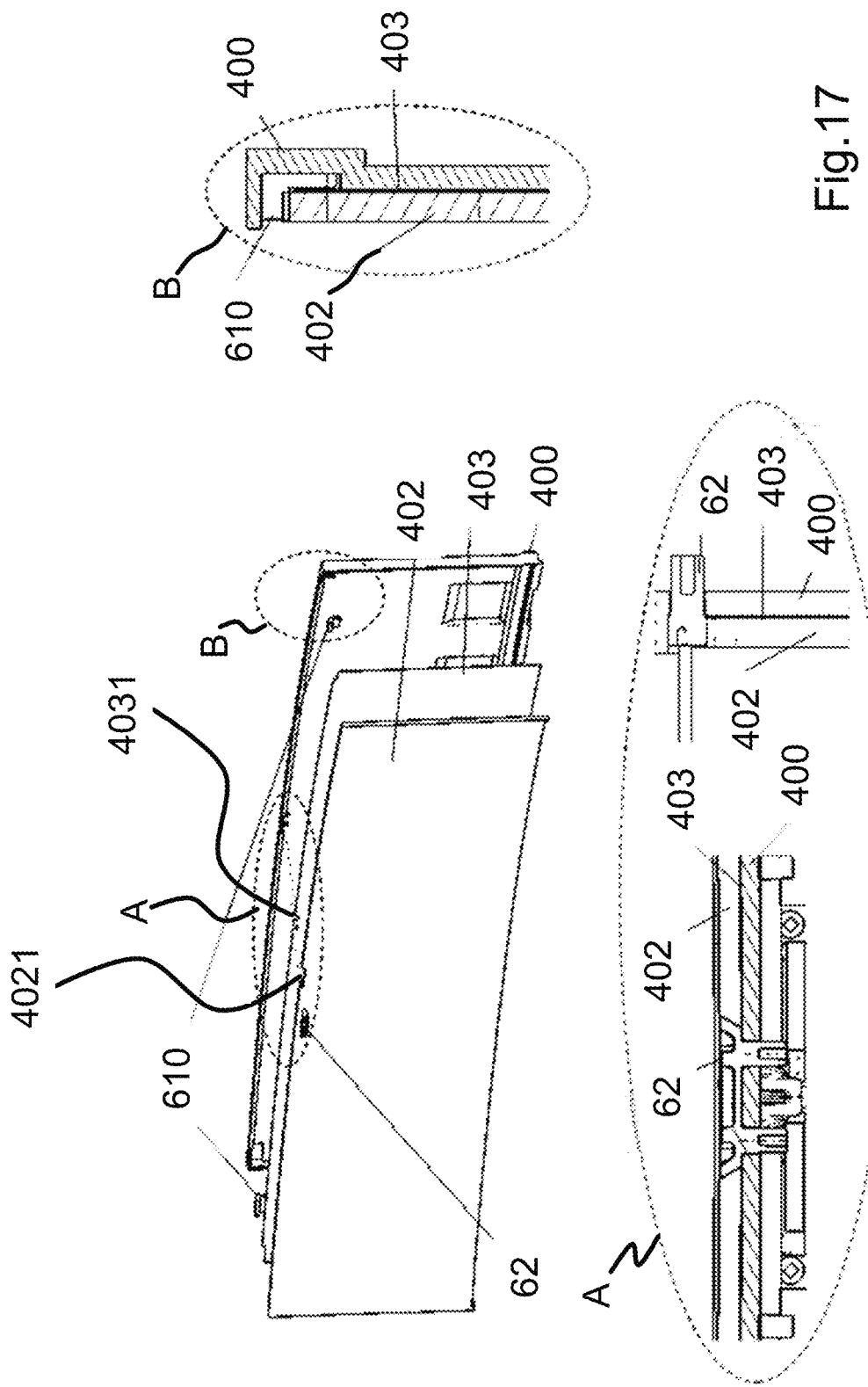
FIG. 17 shows an embodiment of the disclosure.

FIG. 17 shows an embodiment of the disclosure, with details A and B being shown in more detail in enlarged sections. For a display with a two-dimensional display element and an illumination unit for the display element (both not shown here), with the display element having a light source, a light guide 402 and a receiving housing 400, in which the light guide 402 and the reflector 403 are arranged, are shown. The light guide 402 is centered in its longitudinal direction in the middle by a centering element 62 in the receiving housing 400. The centering element 62 interacts with a cutout 4021 in the light guide 402 and with cutouts 4031 in the reflector 403.

The centering element 62 has a hold-down device (bevel, visible in detail A). The light guide 402 is centered in its width direction on the outside by shape-changing elements, the elastomer elements 610 in the receiving housing 400. The centering element 62 consists of a highly reflective material.

The invention claimed is:

1. A display for a vehicle, the display for a vehicle comprising a two-dimensional display element and an illumination unit for the two-dimensional display element comprising a light source, a light guide, and a receiving housing in which the light guide is arranged, wherein the light guide is centered in the middle of a longitudinal side of the light guide by a centering element in the receiving housing, wherein the light guide has a cutout with a sloping undercut, wherein the centering element is arranged in the cutout in the light guide, and wherein the centering element comprises a sloping side wall which bears against the slope of the undercut of the light guide to provide a hold down effect by the centering element.

2. The display as claimed in claim 1, wherein the light guide is centered in its width direction externally in the receiving housing by shape-changing elements.

3. The display as claimed in claim 1, wherein the centering element consists of highly reflective material.

* * * * *